(12) United States Patent
Takita

(10) Patent No.: US 6,304,465 B1
(45) Date of Patent: Oct. 16, 2001

(54) POWER REGULATOR USING ACTIVE FILTER

(75) Inventor: Hiroki Takita, Tokyo (JP)

(73) Assignees: Mitsubishi Electric Semiconductor System Corporation; Mitsubishi Denki Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/456,427

(22) Filed: Dec. 8, 1999

(30) Foreign Application Priority Data

Jul. 13, 1999 (JP) .................................................. 11-199086

(51) Int. Cl.$^7$ ............................. H02M 5/458; H02M 5/42
(52) U.S. Cl. ................................ 363/37; 363/89; 323/222
(58) Field of Search .................................. 363/37, 40, 41, 363/36, 89, 132, 131, 127, 95, 98; 323/282, 222

(56) References Cited

U.S. PATENT DOCUMENTS 5,793,623 * 8/1998 Kawashima et al. .................... 363/56

FOREIGN PATENT DOCUMENTS 5-300794  11/1993 (JP) .
8-35712    2/1996 (JP) .

* cited by examiner

Primary Examiner—Rajnikant B. Patel
(74) Attorney, Agent, or Firm—Burns, Doane, Swecker & Mathis, LLP

(57) ABSTRACT

A power regulator including a coil connected to an output of a DC power source for rectifying an AC voltage, a charge-and-discharge capacitor for charging a current supplied from the DC power source through the coil and a backflow preventing diode, a switching device connected to a connection point of the coil and backflow preventing diode in parallel with the DC power source, and a microcomputer for detecting a zero-cross point of the magnetic field energy generated in the coil or the current flowing through the coil, and for bringing the switching device into conduction in response to the detection of the zero-cross point. This makes it possible to solve a problem of a conventional device in that the switching period of the switching device cannot be changed in accordance with variables such as temperature change, errors in circuit constants and the like because switching periods of the switching device are predetermined values.

5 Claims, 8 Drawing Sheets

POWER REGULATOR USING ACTIVE FILTER

BACKGROUND OF THE INVENTION

1. Field of the Invention

The present invention relates to a power regulator for supplying power to a load efficiently, and more particularly to a power regulator that achieves this by using an active filter.

2. Description of Related Art

As shown in FIG. 6, a power supply for various electrical appliances acquires a DC voltage from a commercial AC line using a rectifier circuit 91 and a large capacity smoothing capacitor 92. The rectifier circuit 91 instantaneously grabs power from the AC line when the AC voltage exceeds a capacitor charged voltage. An inverter 93 operating as a switching circuit converts the DC voltage charged by the capacitor to an AC voltage, and supplies it to a load 94. As clearly seen from FIG. 7, the power is captured only around the peaks of the AC line voltage as illustrated by a solid waveform. Therefore, the effective power is considerably lower than the apparent power of the AC power supply, resulting in a rather low power factor of the electrical appliances of about 50–70%.

In view of this, a power regulator is proposed whose power factor is improved using an active filter 100 as shown in FIG. 8. In FIG. 8, the reference numeral 101 designates an AC power supply; 102 designates a DC power source using a full-wave rectifier; 103 designates a switching device connected in parallel with the DC power source 102 via a coil 104 of the active filter 100 at the output side of the DC power source 102; 105 designates a charge-and-discharge capacitor connected in parallel with the switching device 103 through a backflow preventing diode 106; 107 designates an inverter for supplying a fluorescent lamp 108 with an AC voltage generated by switching the charges of the charge-and-discharge capacitor 105; 109 designates a zero-cross detector for detecting zero-cross points of the AC current; 110 designates an input current detector for detecting consumed current; 111 designates a microcomputer that receives detection signals from the zero-cross detector 109 and input current detector 110; and 112 designates a driver for bringing the switching device 103 into conduction in response to a control signal from the microcomputer 111.

Next, the operation of the conventional power regulator will be described.

The DC power source 102 converts the AC output of the AC power supply 101 into a DC output to charge the charge-and-discharge capacitor 105 via the coil 104 and backflow preventing diode 106. Then, the inverter 107 generates a high frequency AC voltage by switching the voltage charged in the charge-and-discharge capacitor 105, and supplies it to the fluorescent lamp 108.

During charging of the charge-and-discharge capacitor 105, no current will flow from the AC power supply 101 to the charge-and-discharge capacitor 105 in the periods in which the output voltage of the AC power supply 101 is lower than the voltage charged in the charge-and-discharge capacitor 105. In other words, the charge current flows only when the output voltage of the AC power supply 101 is higher than the voltage charged in the charge-and-discharge capacitor 105. This will result in a lower power factor and higher frequency noise.

In view of this, Japanese patent application laid-open No. 5-300794/1993 proposes a technique in which the microcomputer 111 carries out its control as follows. First, the zero-cross detector 109 detects the zero-cross of the AC input, and the microcomputer 111 detects the instantaneous values of the input current successively over the half wave from the zero-cross point. The microcomputer 111 compares the instantaneous values with prestored reference values, regulates the ON time of the switching signal of the switching device 103 in response to the difference of these values, and carries out the ON/OFF control of the switching device 103 through the driver 112 such that the input current (that is, the inductor current) can take a sinusoidal waveform in phase with the input voltage as shown in FIG. 9.

Alternatively, active filter control (for improving power factor) is carried out by a circuit composed of a switching device controlled by a dedicated IC, an inductance and a diode such that the charging is performed even in the duration in which the AC power supply voltage is less than the DC power supply voltage.

In the conventional power regulator with the foregoing arrangement, the periods of the control pulses for bringing the switching device 103 into conduction are predetermined values. This presents a problem of requiring a high performance microcomputer 111 that can instantaneously calculate the consumed current and supply voltage to vary the pulse periods of the control pulses in accordance with the temperature change, circuit constant errors and the like. Furthermore, because bringing the switching device 103 into conduction while the residual field of the coil 104 is not yet sufficiently reduced will cause a short circuit which will cause energy loss and harmonic noise, the pulse periods must be set with considerable margin. This presents a problem of reducing the effect of the power factor improvement.

SUMMARY OF THE INVENTION

The present invention is implemented to solve the foregoing problems. It is therefore an object of the present invention to provide a power regulator capable of providing power to a load efficiently.

According to one aspect of the present invention, there is provided a power regulator comprising: a coil connected to an output of a DC power source for rectifying an AC voltage; a charge-and-discharge capacitor for charging a current supplied from the DC power source through the coil and a backflow preventing diode; an inverter for converting a DC voltage charged in the charge-and-discharge capacitor to an AC voltage to be supplied to a load; a switching device connected, in parallel with the DC power source, to a connection point of the coil and the backflow preventing diode; and a microcomputer for detecting a zero-cross point of one of magnetic field energy generated in the coil and current flowing through the coil, and for bringing the switching device into conduction in response to detection of the zero-cross point.

Here, the microcomputer may comprise a one-shot timer for counting a time period designated by the microcomputer and for supplying the switching device with a control signal to bring it into conduction for the time period, and an A/D converter for converting the voltage charged in the charge-and-discharge capacitor and a voltage at the connection point of the coil and the backflow preventing diode into digital values, wherein the microcomputer may activate the one-shot timer when the voltage at the connection point of the coil and the backflow preventing diode drops below the voltage charged in the charge-and-discharge capacitor to bring the switching device into conduction.

The microcomputer may control the time period to be counted by the one-shot timer in response to a difference between the voltage charged in charge-and-discharge capacitor and a preset reference voltage.

Timing for setting the time period to be counted by the one-shot timer may be synchronized with zero-cross points of the AC voltage.

The microcomputer may inactivate the one-shot timer when the voltage charged in the charge-and-discharge capacitor exceeds a maximum reference voltage.

DETAILED DESCRIPTION OF THE PREFERRED EMBODIMENTS

The invention will now be described with reference to the accompanying drawings.

EMBODIMENT 1

Figure 1:
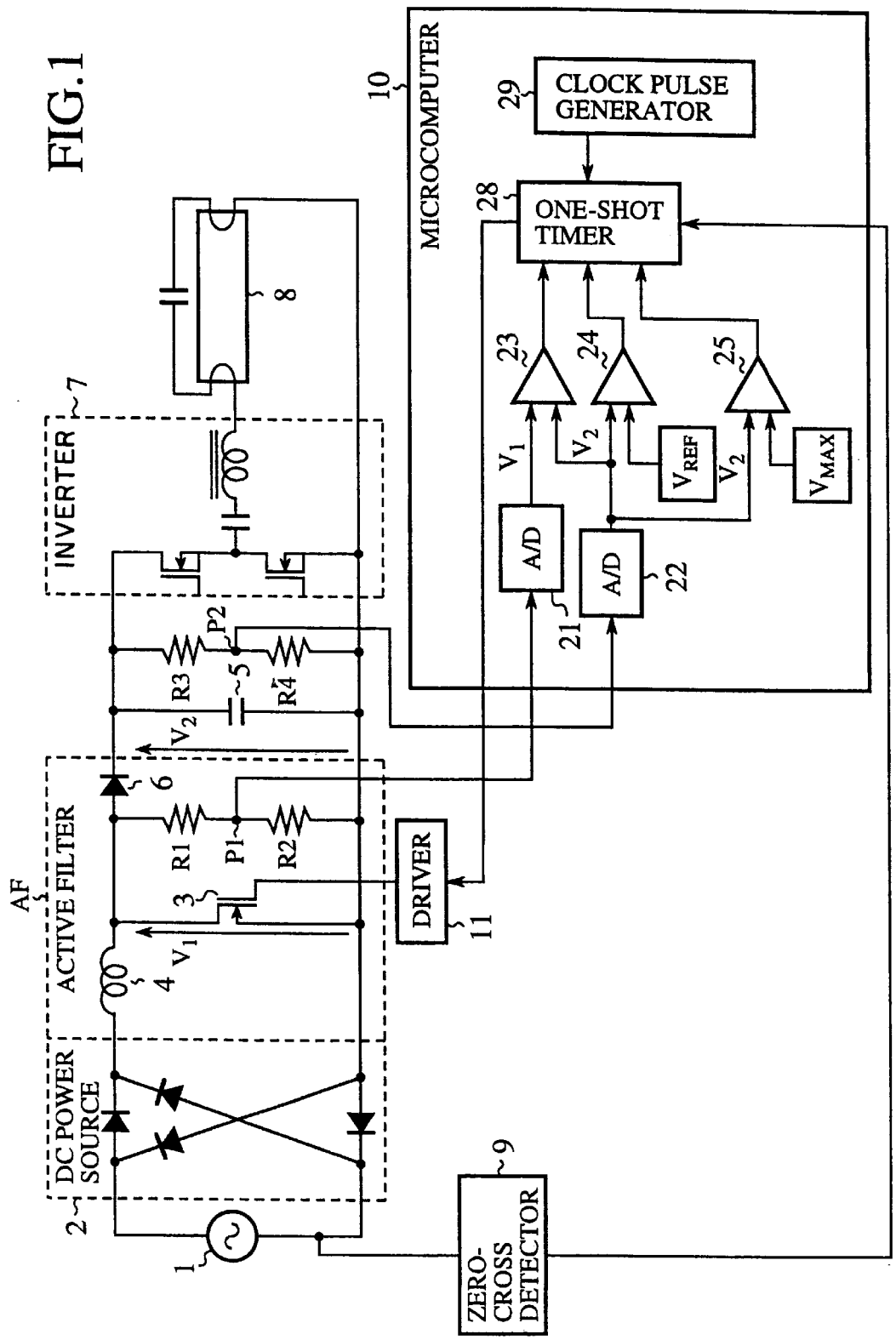
FIG. 1 is a circuit diagram showing a configuration of a power regulator in accordance with the present invention.

FIG. 1 is a circuit diagram showing an embodiment 1 of an active filter control system by a microcomputer in accordance with the present invention. In FIG. 1, the reference numeral 1 designates an AC power supply; 2 designates a DC power source consisting of a full-wave rectifier; 3 designates a switching device connected in parallel with the DC power source 2 at its output side through a coil 4 of an active filter AF; 5 designates a charge-and-discharge capacitor connected in parallel with the switching device 3 through a backflow preventing diode 6; 7 designates an inverter functioning as a switching circuit for switching the charges of charge-and-discharge capacitor 5 and supplies its output to a fluorescent lamp 8; 9 designates a zero-cross detector for detecting zero-cross points of the AC current; 10 designates a microcomputer for receiving a detection signal fed from the zero-cross detector 9, 11 designates a driver for bringing the switching device 3 into conduction in response to a control signal delivered from the microcomputer 10; R1 and R2 designate resistors constituting a series circuit connected in parallel the switching device 3; and R3 and R4 designate resistors constituting a series circuit connected in parallel with the charge-and-discharge capacitor 5. Here, the switching device 3, coil 4 and backflow preventing diode 6 constitute the active filter AF.

The microcomputer 10 comprises an A/D converter 21 for converting the voltage $V_1$ generated by the coil 4 into digital values; an A/D converter 22 for converting the voltage $V_2$ charged by the charge-and-discharge capacitor 5 into digital values; a comparator 23 for comparing the outputs of the A/D converters 21 and 22; a comparator 24 for comparing the output of the A/D converter 22 with a preset reference voltage $V_{REF}$; a comparator 25 for comparing the output of the A/D converter 22 with a preset maximum voltage $V_{MAX}$; and a one-shot timer 28 for counting, under the control of the outputs of the comparators 23–25 and the output of the zero-cross detector 9, the number of pulses fed from a clock pulse generator 29, and for producing the control signal of the switching device 3.

Next, the operation of the present embodiment 1 will be described.

Figure 2:
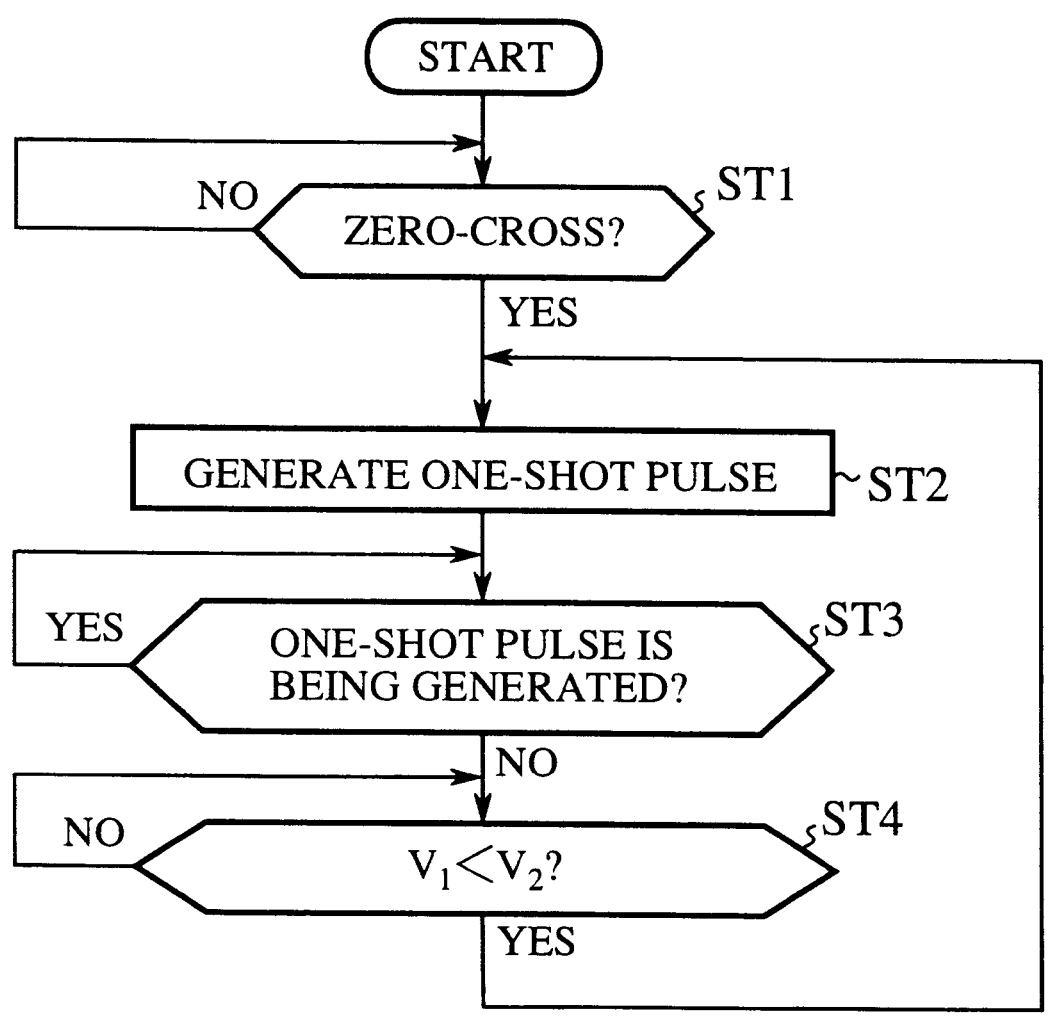
FIG. 2 is a flowchart illustrating an operation of an embodiment 1 in accordance with the present invention.

FIG. 2 is a flowchart illustrating an operation of the present embodiment 1. First, the microcomputer 10 makes a decision as to whether the zero-cross detector 9 detects a zero-cross point or not at step ST1. If the decision result is negative (NO), the microcomputer 10 iterates this operation, and if the decision result is positive (YES), it generates a one-shot pulse with a designated width at step ST2. Here, the one-shot pulse with a designated width refers to a pulse with a width calculated in accordance with the consumed power using the following equation.

$$t_{on}=2P_0L_p/\eta V_{ac}^2$$

where $P_0$: output power $L_p$: inductance $\eta$: power factor $V_{ac}$: line voltage The switching device 3 is brought into conduction by the pulse with the width $t_{on}$.

Thus, the current output from the DC power source 2 flows through the coil 4 and switching device 3 to the ground E, generating magnetic field in the coil 4. The microcomputer 10 makes a decision as to whether the one-shot pulse is being generated or not at step ST3, and continues the decision as long as the decision is positive (YES). If the decision result at step ST3 is negative (NO), that is, if the pulse ends, the switching device 3 is brought out of conduction so that the current flowing through the coil 4 is halted. However, the coil 4 and the magnetic field generated in the coil try to continue the current, thereby increasing the voltage $V_1$ at the connecting point of the coil 4 and the diode 6, thereby generating a voltage greater than the voltage $V_2$ charged in the charge-and-discharge capacitor 5.

This voltage charges the charge-and-discharge capacitor 5 through the backflow preventing diode 6. In other words, the energy of the magnetic field of the coil 4 is converted into electrical energy, and is stored in the charge-and-discharge capacitor 5.

Figure 9:
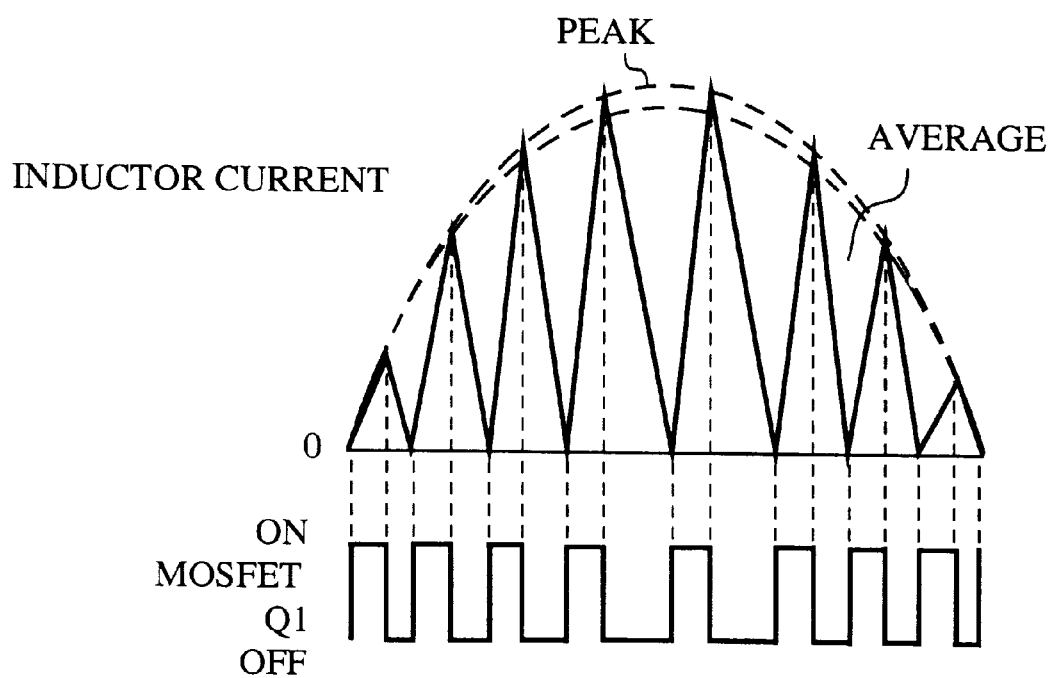
FIG. 9 is a diagram illustrating inductor current and switching gate waveform of a switching device of the circuit as shown in FIG. 8.

However, as the energy of the magnetic field generated in the coil 4 decreases, the voltage $V_1$ at the connection point of the coil 4 and the backflow preventing diode 6 reduces. This is detected by the microcomputer 10. Specifically, the microcomputer 10 compares the voltage $V_1$ obtained from the connection point P1 of the resistors R1 and R2 with the voltage $V_2$ obtained from the connection point P2 of the resistors R3 and R4, and makes a decision as to whether the voltage $V_1$ is lower than the voltage $V_2$ at step ST4. If the decision result is negative, the charge of the capacitor 5 continues, and if the decision result is positive, the microcomputer 10 activates the one-shot time 28 to generate the next one-shot pulse so as to bring the switching device 3 into conduction. Thus, the switching device 3 repeats a plurality of ON/OFF operations in a half wave period as illustrated in FIG. 9, thereby repeating the charge and discharge of the charge-and-discharge capacitor 5.

As described above, the present embodiment 1 detects the zero-cross points of the magnetic field energy generated in the coil 4 or of the current flowing through the coil 4, and operates in response to the detection of the zero-cross points the switching device 3 which is connected in parallel with the charge-and-discharge capacitor 5, thereby automatically regulating the pulse periods of the current in accordance with the temperature change, capacitance of the capacitor 5, and the self-inductance of the coil 4. This makes it possible to flexibly compensate for variables such as temperature change, errors in circuit constants and the like. In addition, it can bring the switching device 3 into conduction immediately after the residual field of the coil is eliminated, improving the power factor substantially.

EMBODIMENT 2

Figure 3:
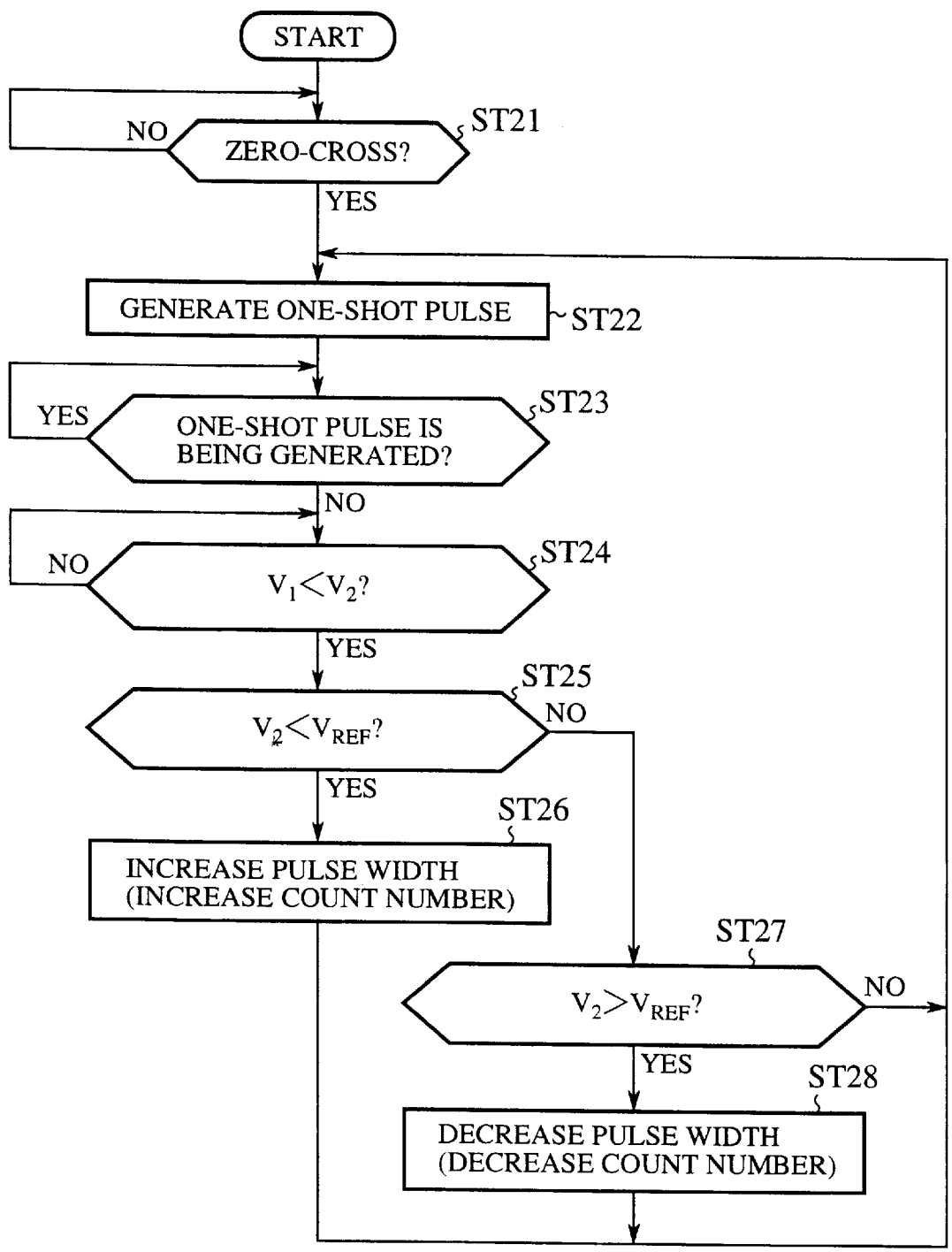
FIG. 3 is a flowchart illustrating an operation of an embodiment 2 in accordance with the present invention.

FIG. 3 is a flowchart illustrating the operation of the present embodiment 2, in which the operation from step ST21 to step ST24 is the same as that from step ST1 to step ST4 of the foregoing embodiment 1, and hence the description thereof is omitted here. At step ST24, the comparator 23 decides whether the voltage $V_1$ at the connecting point of the coil 4 and the backflow preventing diode 6 is lower than the voltage $V_2$ charged in the charge-and-discharge capacitor 5, and subsequently the comparator 24 decides at step ST25 whether the voltage $V_2$ is lower than the reference voltage $V_{REF}$. If the charged voltage $V_2$ is lower than $V_{REF}$, the number of counting of the one-shot timer 28 is increased at step ST26 to broaden the pulse width.

On the other hand, if a decision is made at step ST25 that the voltage $V_2$ is higher than $V_{REF}$, the comparator 24 ensures this at step ST27, and if the result is positive (YES), the number of counting of the one-shot timer 28 is reduced to narrow the pulse width at step ST28. Although the number of counting can be increased or decreased in accordance with the voltage difference, capacitance of the capacitor 5 and self-inductance of the coil 4, the number of counting, that is, the pulse width is not varied as long as the charged voltage $V_2$ is in a range substantially equal to the reference voltage $V_{REF}$.

As described above, the present embodiment 2 increases or decreases the pulse width in accordance with the magnitudes of the voltages $V_2$ and $V_{REF}$, thereby automatically achieving the pulse width regulation and pulse synchronization in response to the power consumption, temperature change, capacitance of the charge-and-discharge capacitor 5 and the self-inductance of the coil 4. This makes it possible to flexibly handle the variables such as errors in the power consumption, temperature change, and errors in circuit constants.

EMBODIMENT 3

Figure 4:
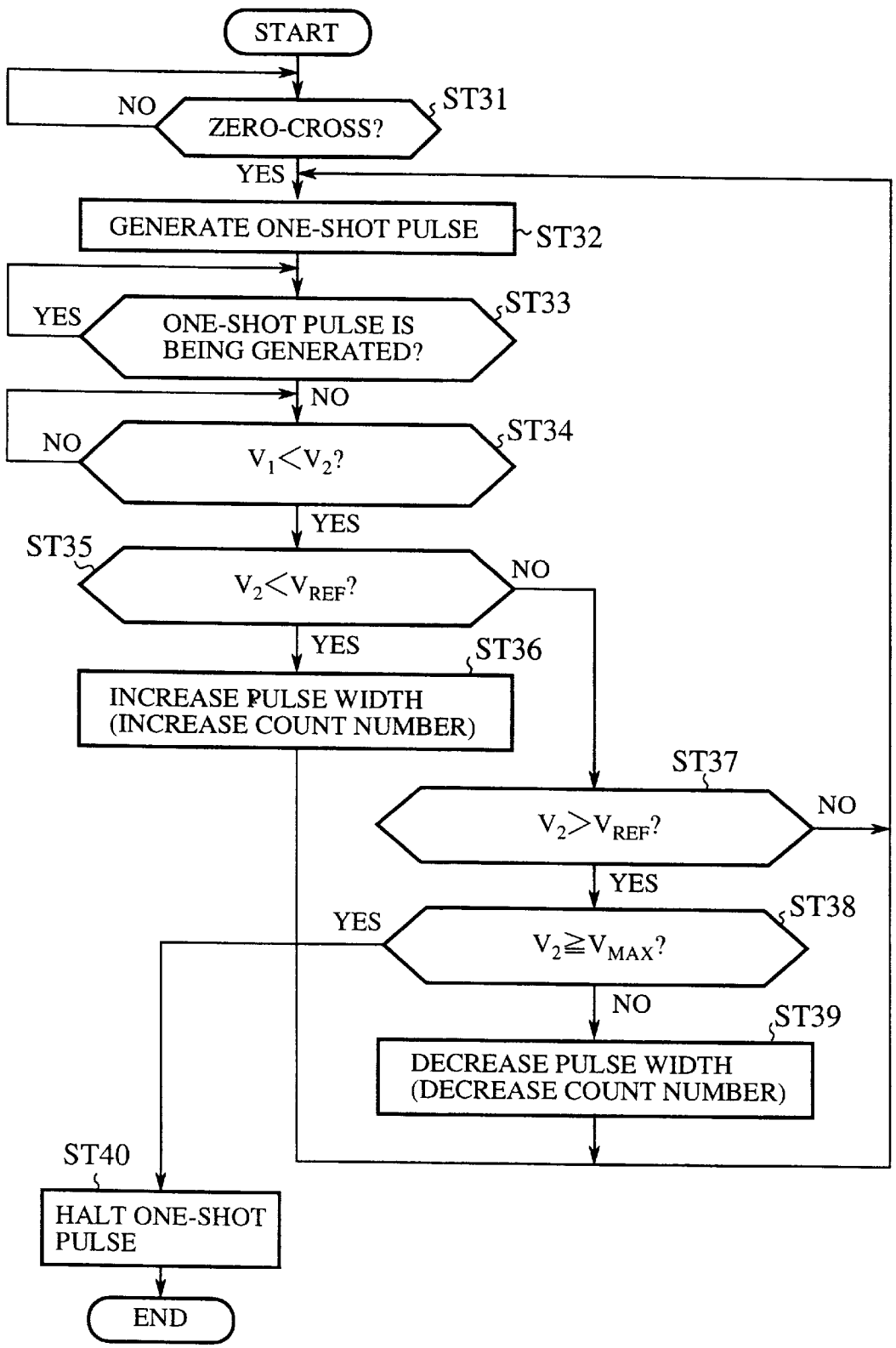
FIG. 4 is a flowchart illustrating an operation of an embodiment 3 in accordance with the present invention.

FIG. 4 is a flowchart illustrating the operation of the present embodiment 3, in which the operation from step ST31 to step ST37 is the same as that from step ST21 to step ST27 in the foregoing embodiment 2, and hence the description thereof is omitted here.

In the present embodiment 3, when a decision is made at step ST37 that the charged voltage $V_2$ is higher than the reference voltage $V_{REF}$, the comparator 25 makes a decision at step ST38 as to whether the voltage $V_2$ exceeds the maximum reference voltage $V_{MAX}$, and if the result is positive (YES), the one-shot timer 28 is controlled to stop generating the one-shot pulse at step ST40. In contrast, when the decision result is negative (NO), that is, when $V_2 < V_{MAX}$, the pulse width is reduce at step ST39, and the processing returns to step ST32.

According to the present embodiment 3, the charge-and-discharge capacitor 5, the voltage $V_2$ of which can suddenly increase when the load consuming the power is removed because of the active filter, must be protected from the sudden voltage rise. This is implemented by halting the one-shot pulse by the microcomputer 10.

EMBODIMENT 5

Figure 5:
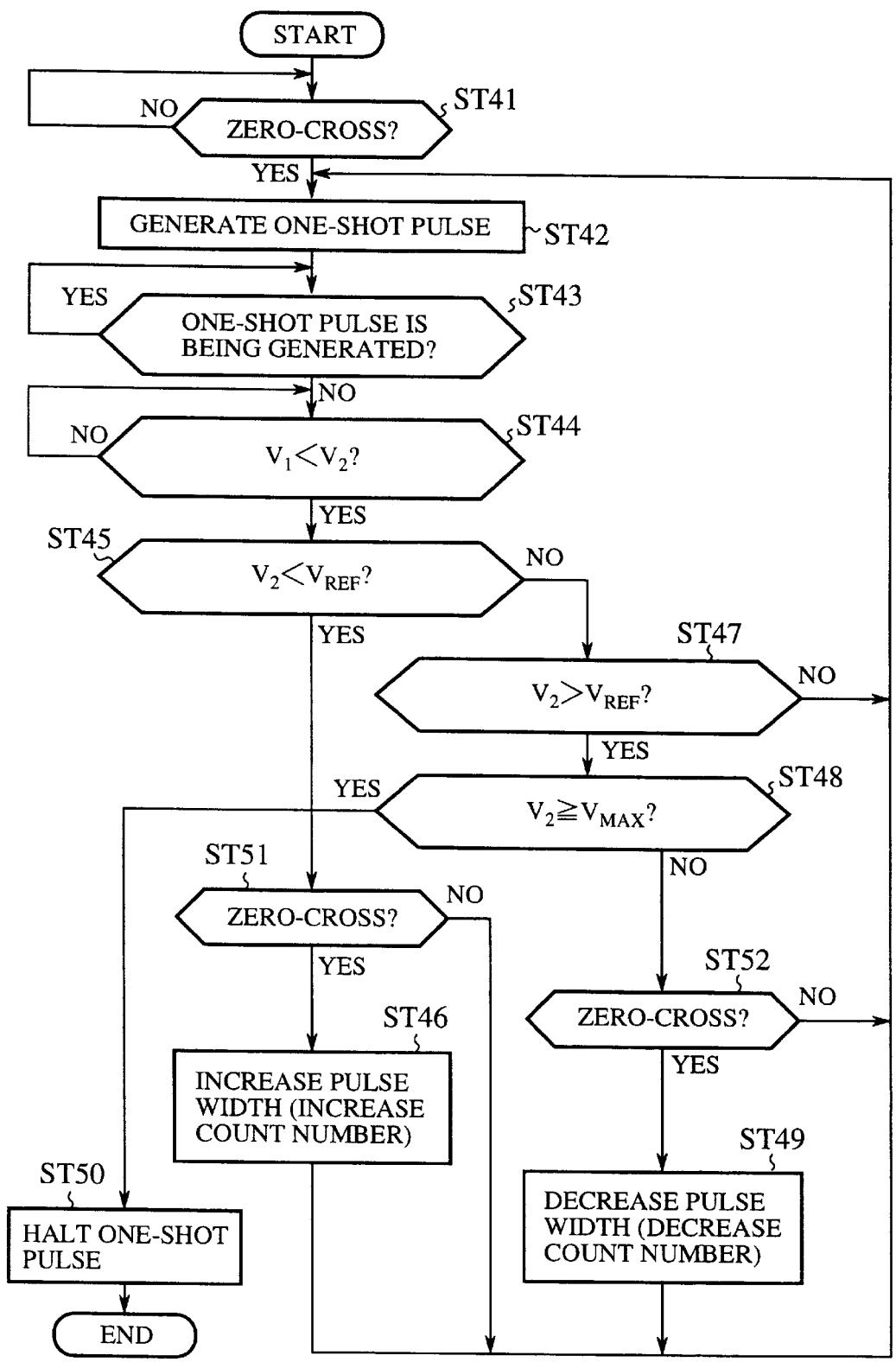
FIG. 5 is a flowchart illustrating an operation of an embodiment 4 in accordance with the present invention.
Figure 6:
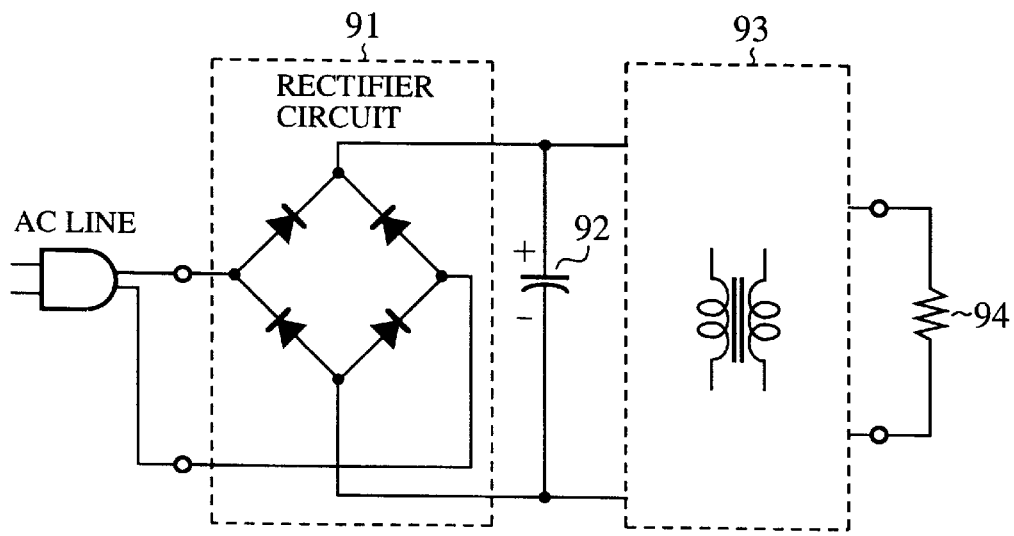
FIG. 6 is a block diagram showing a configuration of a conventional power regulator.
Figure 7:
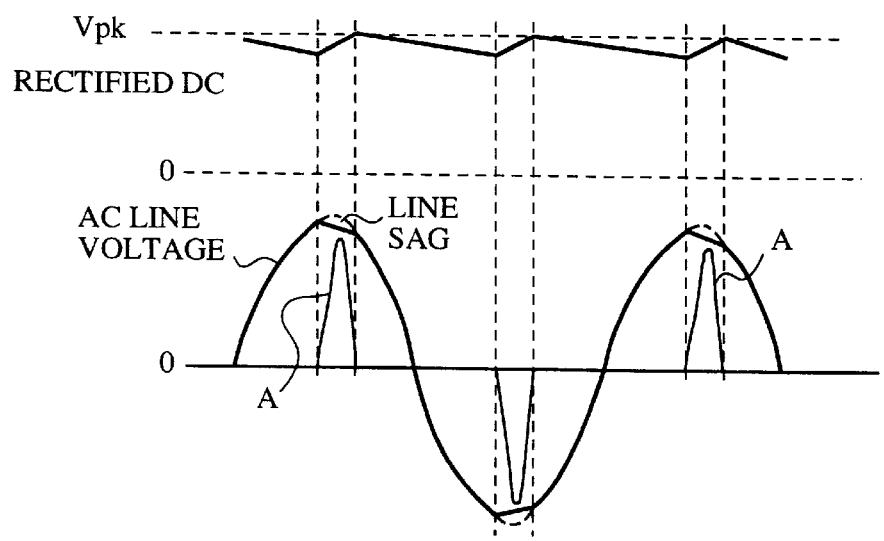
FIG. 7 is a diagram illustrating the charging operation of a charge-and-discharge capacitor of the device as shown in FIG. 6.
Figure 8:
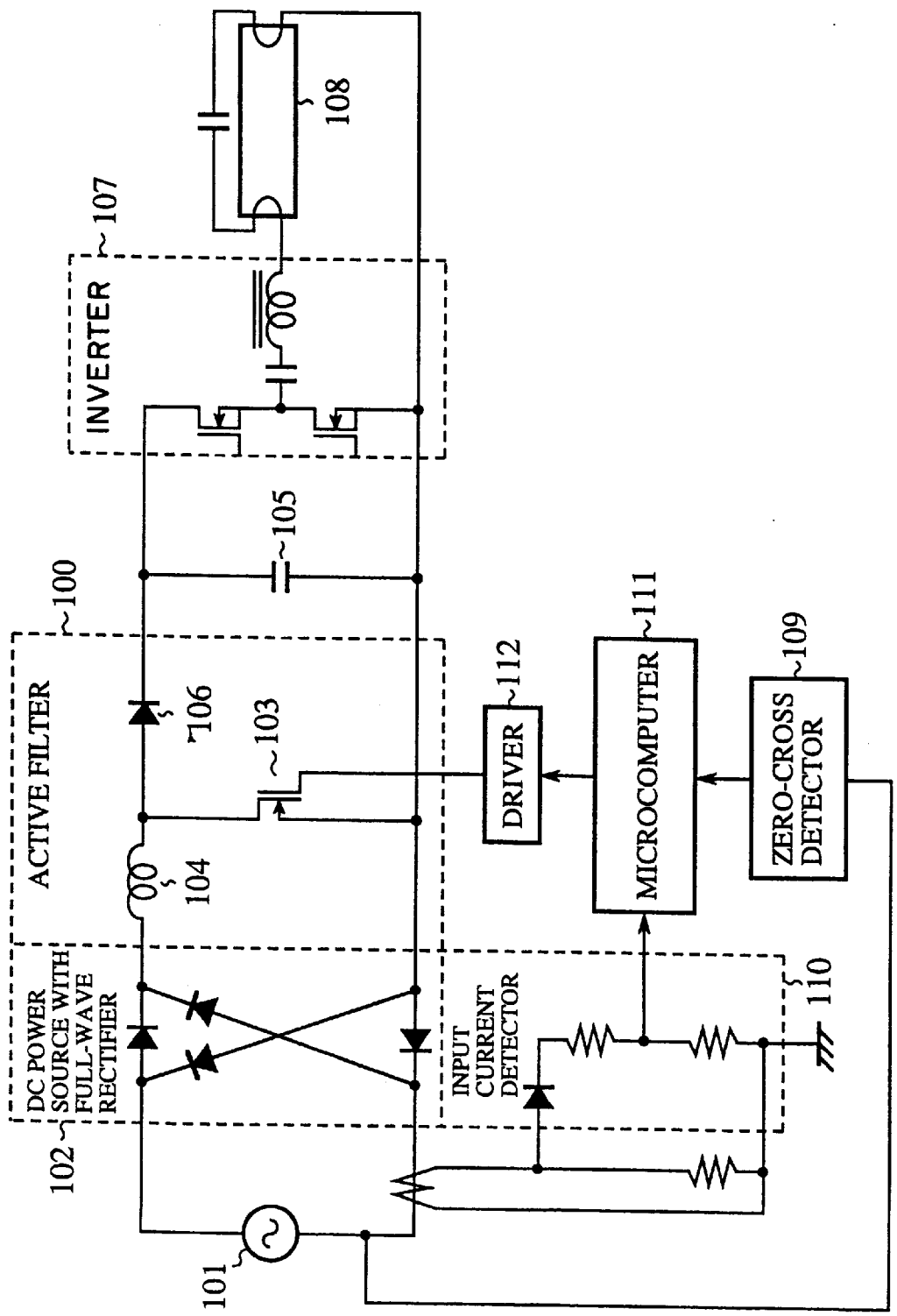
FIG. 8 is a block diagram showing a configuration of another conventional power regulator.

FIG. 5 is a flowchart illustrating the operation of an embodiment 4, in which the operation from step ST41 to step ST50 is the same as that from step ST31 to step ST40 of the foregoing embodiment 3. In the present embodiment 4, a decision is made at steps step ST51 and ST52 as to whether there is a zero-cross point or not, that is, whether the zero-cross detector 9 outputs the zero-cross point detecting signal to start the counting of the one-shot timer from the zero-cross point. In other words, the consumed power is controlled to match the power curve in each AC cycle by synchronizing the changes in the pulse width with the waveform of the AC power supply.

According to the present embodiment 4, the changes in the pulse width are synchronized with the zero-cross points. This makes it possible to eliminate the fluctuations in the consumed power curve in each half wave, thereby offering an advantage of being able to eliminate variations in the power factor.

What is claimed is:

1. A power regulator comprising:
   a coil connected to an output of a DC power source for rectifying an AC voltage;
   a charge-and-discharge capacitor for charging a current supplied from the DC power source through said coil and a backflow preventing diode;
   an inverter for converting a DC voltage charged in said charge-and-discharge capacitor to an AC voltage to be supplied to a load;
   a switching device connected, in parallel with the DC power source, to a connection point of said coil and the backflow preventing diode; and
   a microcomputer for detecting a zero-cross point of one of magnetic field energy generated in said coil and current flowing through said coil, and for bringing said switching device into conduction in response to detection of the zero-cross point.

2. The power regulator according to claim 1, wherein said microcomputer comprises a one-shot timer for counting a time period designated by said microcomputer and for supplying said switching device with a control signal to bring it into conduction for the time period, and an A/D converter for converting the voltage charged in said charge-and-discharge capacitor and a voltage at the connection point of said coil and the backflow preventing diode into digital values, and wherein said microcomputer activates said one-shot timer when the voltage at the connection point of the coil and the backflow preventing diode drops below the voltage charged in the charge-and-discharge capacitor to bring said switching device into conduction.

3. The power regulator according to claim 2, wherein said microcomputer controls the time period to be counted by said one-shot timer in response to a difference between the voltage charged in charge-and-discharge capacitor and a preset reference voltage.

4. The power regulator according to claim 3, wherein timing for setting the time period to be counted by said one-shot timer is synchronized with zero-cross points of the AC voltage.

5. The power regulator according to claim 4, wherein said microcomputer inactivates said one-shot timer when the voltage charged in said charge-and-discharge capacitor exceeds a maximum reference voltage.

* * * * *